(12) United States Patent
Tateiwa (10) Patent No.: US 9,856,031 B2
(45) Date of Patent: Jan. 2, 2018

(54) AIRCRAFT INCLUDING TURBOFAN ENGINE AND IGNITER CABLE

(71) Applicant: MITSUBISHI AIRCRAFT CORPORATION, Aichi (JP)

(72) Inventor: Jingo Tateiwa, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 154 days.

(21) Appl. No.: 14/614,650

(22) Filed: Feb. 5, 2015

(65) Prior Publication Data

US 2015/0232188 A1    Aug. 20, 2015

(30) Foreign Application Priority Data

Feb. 18, 2014   (JP) ................... 2014-028916

(51) Int. Cl.
| | |
|---|---|
| *B64D 27/00* | (2006.01) |
| *B64D 29/02* | (2006.01) |
| *B64D 27/18* | (2006.01) |
| *F02C 7/20* | (2006.01) |
| *F02C 7/266* | (2006.01) |

(52) U.S. Cl.
CPC ............ *B64D 29/02* (2013.01); *B64D 27/18* (2013.01); *F02C 7/20* (2013.01); *F02C 7/266* (2013.01); *F05D 2240/91* (2013.01); *F05D 2250/30* (2013.01); *Y02T 50/44* (2013.01); *Y02T 50/671* (2013.01)

(58) Field of Classification Search
CPC . B64D 29/02; B64D 27/18; F02C 7/20; F02C 7/266; F05D 2250/30; F05D 2240/91; Y02T 50/671; Y02T 50/44
See application file for complete search history.

(56) References Cited

U.S. PATENT DOCUMENTS

| | | | | |
|---|---|---|---|---|
| 3,487,636 | A * | 1/1970 | Scott ................... | F02C 7/266 60/39.827 |
| 3,820,719 | A * | 6/1974 | Clark ................... | F02K 1/66 239/265.31 |
| 8,713,908 | B2 * | 5/2014 | Harding .............. | F02C 7/266 60/39.821 |
| 2004/0050061 | A1 * | 3/2004 | Schmotolocha ..... | F02K 3/10 60/761 |
| 2004/0187476 | A1 * | 9/2004 | Lair .................... | B64D 33/04 60/226.1 |
| 2006/0037304 | A1 | 2/2006 | Mehrer et al. | |

(Continued)

FOREIGN PATENT DOCUMENTS

| | | |
|---|---|---|
| JP | 2002106362 A | 4/2002 |
| JP | 2006-283621 A | 10/2006 |
| JP | 2009036197 A | 2/2009 |

OTHER PUBLICATIONS

Japanese Office Action with translation for corresponding Japanese Application No. 2014-028916 dated Aug. 30, 2017.

*Primary Examiner* — Assres H Woldemaryam
(74) *Attorney, Agent, or Firm* — Pearne & Gordon LLP (57) ABSTRACT

An aircraft with a turbofan engine including an engine body and a fan, wherein the turbofan engine is supported on an airframe via a pylon, an igniter cable is interposed between an ignition plug of the engine and an ignition control unit that controls power supply to the ignition plug, and at least a part of the igniter cable is passed through an inside of the pylon.

11 Claims, 5 Drawing Sheets

(56) References Cited

U.S. PATENT DOCUMENTS

| | | | |
|---|---|---|---|
| 2006/0235601 A1 | 10/2006 | Uruno et al. | |
| 2007/0137207 A1* | 6/2007 | Mancini | F23R 3/14 60/737 |
| 2010/0154382 A1* | 6/2010 | Wright | F02P 3/0892 60/39.827 |
| 2010/0186368 A1* | 7/2010 | Ikeda | F02C 7/264 60/39.821 |
| 2011/0077895 A1* | 3/2011 | Muramatsu | G01K 7/42 702/130 |
| 2012/0180509 A1* | 7/2012 | DeFrancesco | B64D 13/08 62/172 |
| 2013/0097992 A1* | 4/2013 | Suciu | F02C 7/08 60/39.83 |
| 2013/0098046 A1* | 4/2013 | Suciu | F02C 7/08 60/772 |
| 2013/0145745 A1* | 6/2013 | Kohlenberg | B64D 33/04 60/226.3 |
| 2013/0160461 A1* | 6/2013 | Broughton | F02C 7/12 60/796 |
| 2013/0220435 A1* | 8/2013 | James | B64D 29/08 137/15.1 |
| 2013/0221157 A1* | 8/2013 | MacHado | B64C 7/02 244/130 |
| 2014/0238038 A1* | 8/2014 | MacChia | F02C 7/264 60/778 |
| 2014/0319269 A1* | 10/2014 | Scarr | B64D 29/06 244/54 |
| 2014/0345292 A1* | 11/2014 | Diaz | F02C 7/047 60/779 |
| 2015/0036781 A1* | 2/2015 | Youssef | G07C 3/08 377/15 |
| 2015/0232188 A1* | 8/2015 | Tateiwa | B64D 29/02 244/54 |

* cited by examiner

AIRCRAFT INCLUDING TURBOFAN ENGINE AND IGNITER CABLE

BACKGROUND OF THE INVENTION

Field of the Invention

The present invention relates to a turbofan engine of an aircraft.

Description of the Related Art

A turbofan engine of aircraft includes a fan that is rotated by power created by the engine. When the turbofan engine is operated, air is divided to an engine body and a bypass flow path inside a nacelle. Air passing through the bypass flow path and air discharged from a nozzle of the engine body join each other to be jetted backward. Thrust is obtained as a reaction of the jet flow.

The turbofan engine is provided with a fuel control unit that electronically controls fuel supply, and an ignition control unit that electronically controls power supply to an ignition plug (e.g., Japanese Patent Laid-Open No. 2006-283621).

A mixture of fuel and compressed air is ignited by producing a spark at the ignition plug under the control of the control units, so that the engine is ignited.

A high voltage generated by the ignition control unit including an ignition coil is supplied to the ignition plug through an igniter cable (high tension cable).

The ignition plug is provided in a combustion chamber of the engine, and the ignition control unit is provided ahead of the ignition plug, e.g., on the outer periphery of a fan case.

The igniter cable connecting the ignition plug and the ignition control unit is passed through a lower region of the bypass flow path. Each of upper and lower regions of the bypass flow path is used as an outfitting space in which engine accessories are installed.

In some cases, an interval between the nacelle and a core cowl is small because of such reasons that the engine body has a large diameter, or the diameter of the nacelle cannot be increased due to limitations on ground clearance. In this case, there is a demand for ensuring required thrust at low fuel consumption, and also ensuring a sufficient braking force at the time of landing by reverse thrust by reducing a circumferential dimension (width) of each of the upper and lower regions of the bypass flow path to secure a flow path sectional area meeting the required thrust.

However, when the widths of the outfitting spaces are too small, the lower outfitting space does not have a sufficient space for passing the igniter cable, and other lines and pipes.

Thus, an object of the present invention is to provide an aircraft capable of obtaining required thrust at low fuel consumption, and also ensuring a sufficient braking force at the time of landing by setting wiring paths of lines and pipes at appropriate positions even when there is not a sufficient space for passing the lines and pipes due to a small interval between a nacelle and a core cowl.

SUMMARY OF THE INVENTION

The present invention is an aircraft including a turbofan engine including an engine body and a fan, wherein the turbofan engine is supported on an airframe via a pylon, an igniter cable is interposed between an ignition plug of the engine and an ignition control unit that controls power supply to the ignition plug, and at least a part of the igniter cable is passed through an inside of the pylon.

The pylon is a primary structural member provided in the airframe, and includes a pylon body typically formed in a box-like shape, and a fairing that covers the pylon body.

Here, an inner portion of the pylon body falls under the "inside of the pylon". A portion outside of the pylon body but inside of the fairing also falls under the "inside of the pylon".

In the aircraft of the present invention, the ignition control unit is preferably installed at an upper portion of a case of the fan.

The aircraft of the present invention may include an engine oil cooler that is a heat exchanger cooling engine oil used in the engine body by using air flowing out of the fan as a cold source, and a precooler that is a heat exchanger cooling bleed air from the engine body by using air flowing out of the fan as a cold source, wherein the engine oil cooler and the precooler are arranged between the pylon and the engine body.

Even when an interval between a nacelle and a core cowl is small, it is possible to accommodate all of required pipes and lines in upper and lower regions of a bypass flow path serving as outfitting spaces and the inside of the pylon in response to a demand for ensuring required thrust at low fuel consumption and also ensuring a sufficient braking force at the time of landing by reducing circumferential dimensions (widths) of the outfitting spaces.

Therefore, it is possible to achieve low fuel consumption and also ensure a sufficient braking force by reducing the widths of the outfitting spaces to required minimum values.

When the ignition control unit is installed at the upper portion of the case of the fan, the igniter cable passed through the inside of the pylon can be connected to the ignition control unit at a position close to a front end of the pylon. The length of the igniter cable can be thereby reduced, so that weight reduction and improvement of fuel consumption of the aircraft can be achieved.

DETAILED DESCRIPTION OF THE PREFERRED EMBODIMENTS

In the following, an embodiment of the present invention is described by reference to the accompanying drawings.

Figure 1:
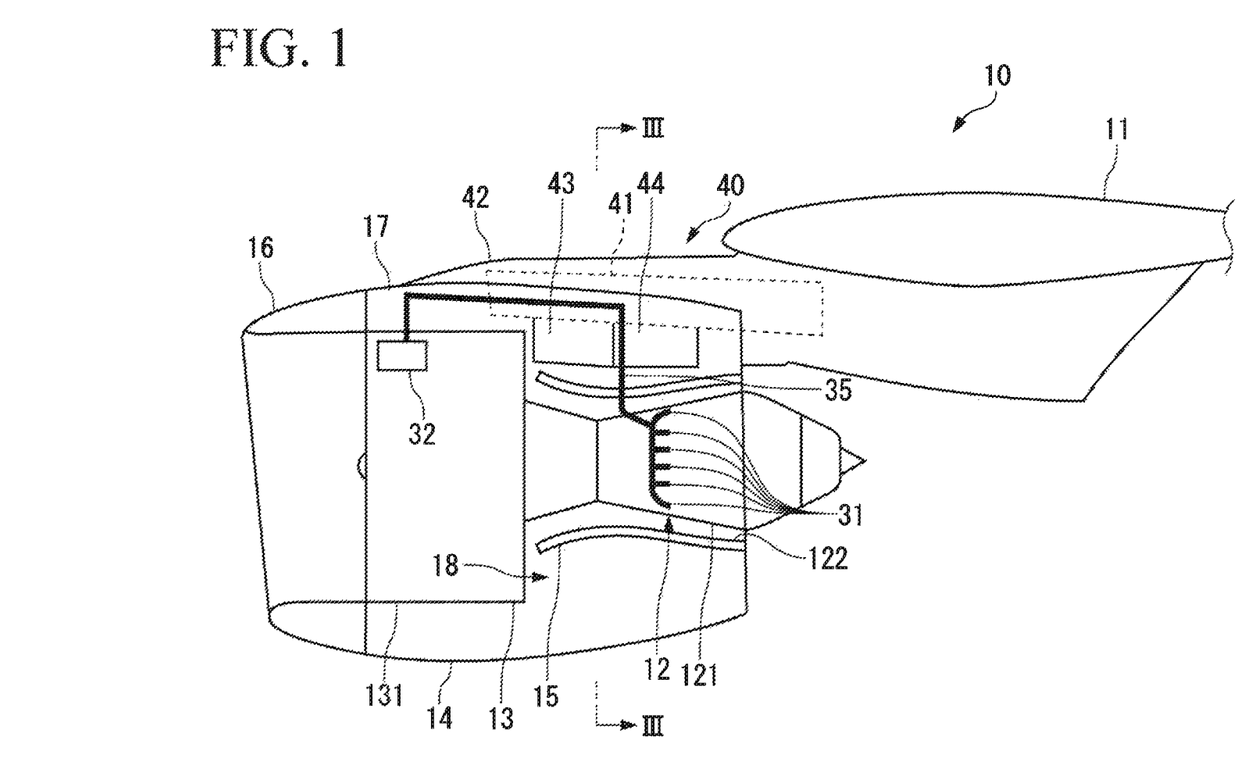
FIG. 1 is a schematic view illustrating a schematic structure of a turbofan engine (a left-side engine) of an aircraft according to an embodiment of the present invention.

An aircraft according to the embodiment of the present invention includes a turbofan engine 10 shown in FIG. 1.

The turbofan engine 10 is supported on a lower side of a main wing 11 via a pylon 40.

The turbofan engine 10 includes an engine body 12, a fan 13, a nacelle 14 that constitutes an outer shell of the turbofan engine 10, and a core cowl 15 that is provided on an inner side of the nacelle 14.

The engine body 12 includes a low-pressure compressor, a high-pressure compressor, a combustion chamber, a high-pressure turbine, and a low-pressure turbine although the constituent elements are not shown in the drawings. The constituent elements are accommodated in an engine case 121. A jet flow created by the engine body 12 is jetted from an exhaust nozzle 122.

Figure 2:
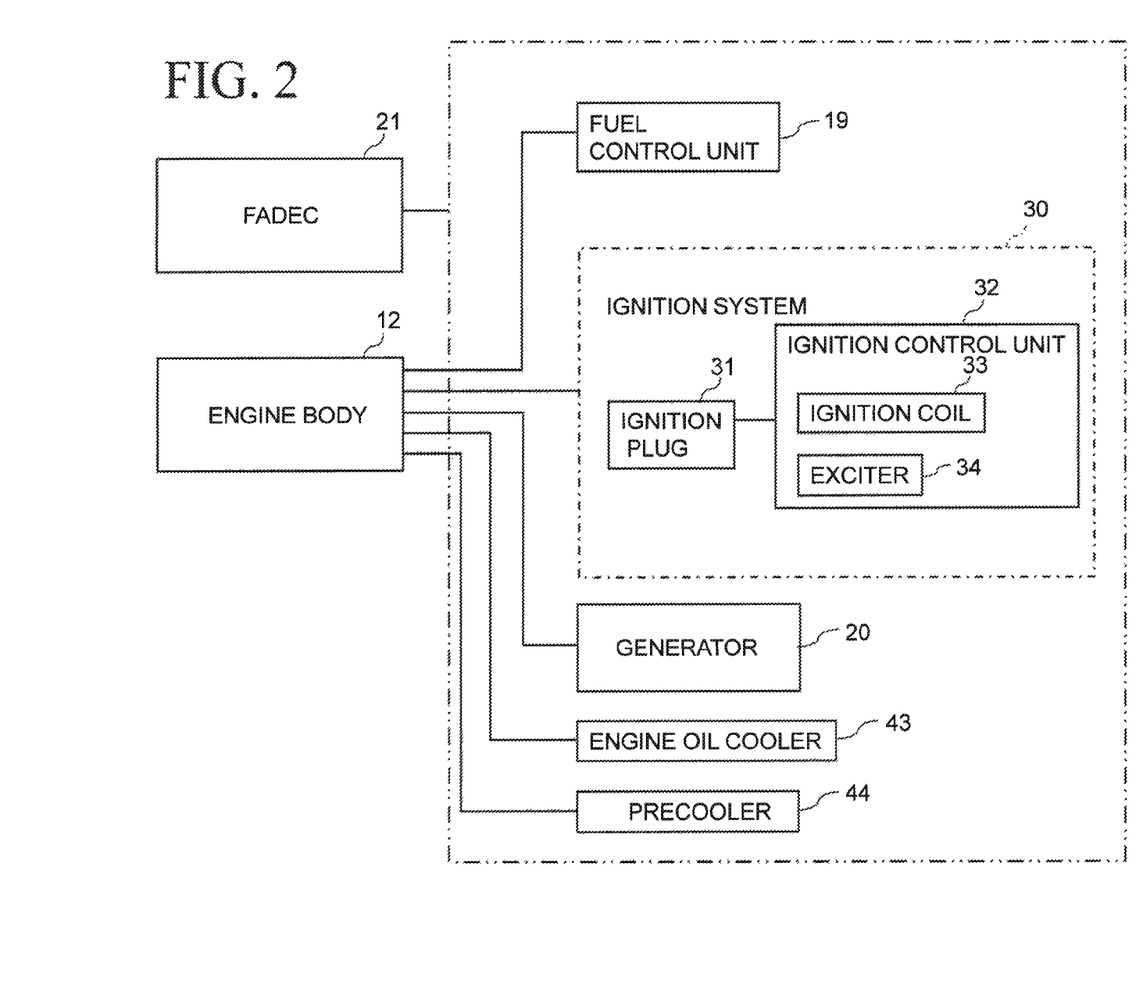
FIG. 2 is a block diagram illustrating some of engine accessories provided in the turbofan engine.

The engine body 12 is provided with engine accessories such as a fuel control unit 19, an ignition system 30 including a plurality of ignition plugs 31 and an ignition control unit 32, a generator 20, an engine oil cooler 43, and a precooler 44 as shown in FIG. 2 as one example.

The fuel control unit 19 includes a fuel pump and a plurality of valves. The fuel control unit 19 electronically controls a flow rate of fuel supplied to the engine body 12.

The ignition system 30 includes the ignition plugs 31 that are located in the combustion chamber, and the ignition control unit 32 that electronically controls power supply to the ignition plugs 31.

The ignition control unit 32 includes an ignition coil 33 and an exciter 34. A high voltage generated by the ignition coil 33 is further boosted by the exciter 34.

As shown in FIG. 1, the ignition control unit 32 is installed on the outer periphery of a case 131 of the fan 13 in order to be grounded. The high voltage is applied to the ignition plugs 31 via an igniter cable 35. To ensure redundancy, two igniter cables 35 (only one of which is shown) are used.

The igniter cables 35 are wired apart a predetermined distance from other electric lines in order to avoid electromagnetic interference in electric lines arranged around the igniter cables 35. The igniter cables 35 are also wired apart a predetermined distance from other structures including pipes and lines such that heat emitted from the igniter cables 35 is not accumulated.

When a mixture of fuel and compressed air is ignited by producing sparks at the ignition plugs 31 under the control of the fuel control unit 19 and the ignition control unit 32, the engine body 12 is ignited.

The engine body 12 is also provided with a FADEC 21 (full authority digital engine control) that controls the engine body 12 so as to obtain optimum performance in view of safety and fuel consumption by controlling the operations of the engine accessories.

The FADEC 21 adjusts thrust by issuing a command to the fuel control unit 19 and the ignition control unit 32 based on a lever position of a thrust lever operated by a pilot and a mode prepared for the turbofan engine 10.

Returning to FIG. 1, the fan 13 is arranged ahead of the engine body 12, and rotated when a rotational force of the high-pressure turbine or the low-pressure turbine of the engine body 12 is transferred.

The nacelle 14 includes an air inlet 16 that is located at a front end, and a cowl 17 that is provided continuously to the air inlet 16. Although not shown in the drawings, the cowl 17 includes a first cowl and a second cowl that is provided continuously to a rear side of the first cowl. The second cowl is slid backward when a thrust reverser is operated.

As for the diameter of the nacelle 14, the upper limit of the diameter of the nacelle 14 is determined based on a demand for ensuring a prescribed height or more between a lower portion of the nacelle 14 and the ground in order to avoid damage to the fan 13 due to dust and foreign matter raised from the ground, and since it is difficult to extend a main landing gear in order to avoid an increase in weight.

The core cowl 15 covers the engine body 12 behind the fan 13.

Air is introduced into the nacelle 14 from the air inlet 16, and discharged backward by the fan 13. The air is thereby divided into a flow to be supplied to the engine body 12 in the engine case 121, and a flow (fan flow) passing through a bypass flow path 18 between the core cowl 15 and the nacelle 14 (the cowl 17).

The fan flow traveling backward from the bypass flow path 18 and the jet flow discharged from the exhaust nozzle 122 join each other to be jetted backward.

The above thrust reverser blocks the fan flow and jets the flow forward from a gap of the cowl 17 (a gap between the first cowl and the second cowl) to thereby brake the aircraft at the time of landing.

Figure 3:
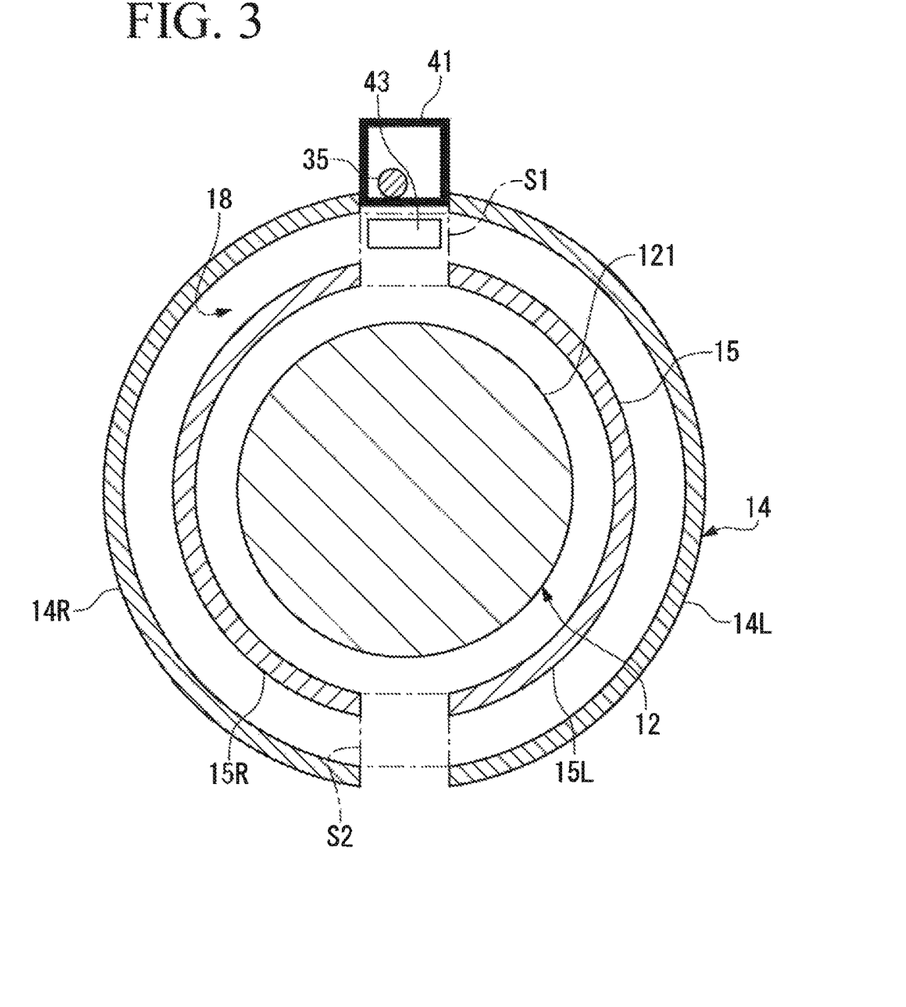
FIG. 3 is a cross-sectional view taken along a line III-III in FIG. 1.

Both of the nacelle 14 and the core cowl 15 described above have a form divided along a longitudinal direction at an upper portion (the twelve o'clock position) and a lower portion (the six o'clock position) as shown in FIG. 3.

For example, the nacelle 14 has a right side portion 14R and a left side portion 14L. The right side portion 14R and the left side portion 14L are supported on the pylon 40 by a hinge portion (not shown) that is located at the upper portion. The right side portion 14R and the left side portion 14L are turned outward about the hinge portion at the time of maintenance.

A right side portion 15R and a left side portion 15L of the core cowl 15 are similarly configured.

The engine accessories, and pipes, lines, sensors, valves, actuators etc. accompanying the engine accessories (referred to as accessories below) are arranged in a fire compartment between the engine case 121 and the core cowl 15, in outfitting spaces S1 and S2 respectively formed between the right side portions 14R and 15R and the left side portions 14L and 15L each having an arc shape in section, and in a pylon body 41.

The outfitting spaces S1 and S2 are formed continuously from a front end to a rear end of the core cowl 15.

An upper region of the bypass flow path 18 is used as the upper outfitting space S1 in which the accessories are arranged. A lower region of the bypass flow path 18 is used as the lower outfitting space S2 in which the accessories are arranged.

By collectively installing the accessories in the upper outfitting space S1 or the lower outfitting space S2, a region in which the fan flow is disturbed by the accessories is limited to the upper region and the lower region of the bypass flow path 18.

In the present embodiment, the ratio of the diameter of the engine body 12 to the diameter of the nacelle 14 is large, and the diameter of the nacelle 14 cannot be increased due to limitations on ground clearance. Thus, an interval between the inner periphery of the nacelle 14 and the outer periphery of the core cowl 15 is small. Therefore, the bypass flow path 18 has a small radial dimension (height).

To ensure a flow path sectional area meeting required thrust even when the bypass flow path 18 is radially narrow as described above, circumferential dimensions (widths) of the outfitting spaces S1 and S2 in which the accessories are arranged are set as small as possible.

Although the width of the upper outfitting space S1 and the width of the lower outfitting space S2 do not need to be the same, both of the widths of the outfitting spaces S1 and S2 are preferably set to required minimum values.

The pylon 40 used for supporting the turbofan engine 10 on the main wing 11 includes the pylon body 41 that is a primary structural member, and a fairing 42 that covers the pylon body 41 as shown in FIG. 1.

The pylon body 41 is formed in a box-like shape having a rectangular shape in section, and longitudinally extends.

A lower portion of the pylon body 41 faces the upper outfitting space S1 as shown in FIG. 3.

Here, the pylon body 41 serves as resistance against the fan flow flowing through a region around the upper outfitting space S1. Thus, to obtain required thrust, a circumferential dimension (width) of the pylon body 41 is set as small as possible.

The width of the pylon body 41 may be equal to or different from the width of the upper outfitting space S1, and is preferably set to a required minimum value.

In some cases, the accessories such as the engine oil cooler 43 and the precooler 44 are arranged within the pylon body. However, an inner portion of the pylon body 41 of the present embodiment does not have a volume large enough to arrange the accessories therein due to the small width.

In the present embodiment, the engine oil cooler 43 and the precooler 44 are suspended from a lower side of the pylon body 41 (FIG. 1).

Figure 4:
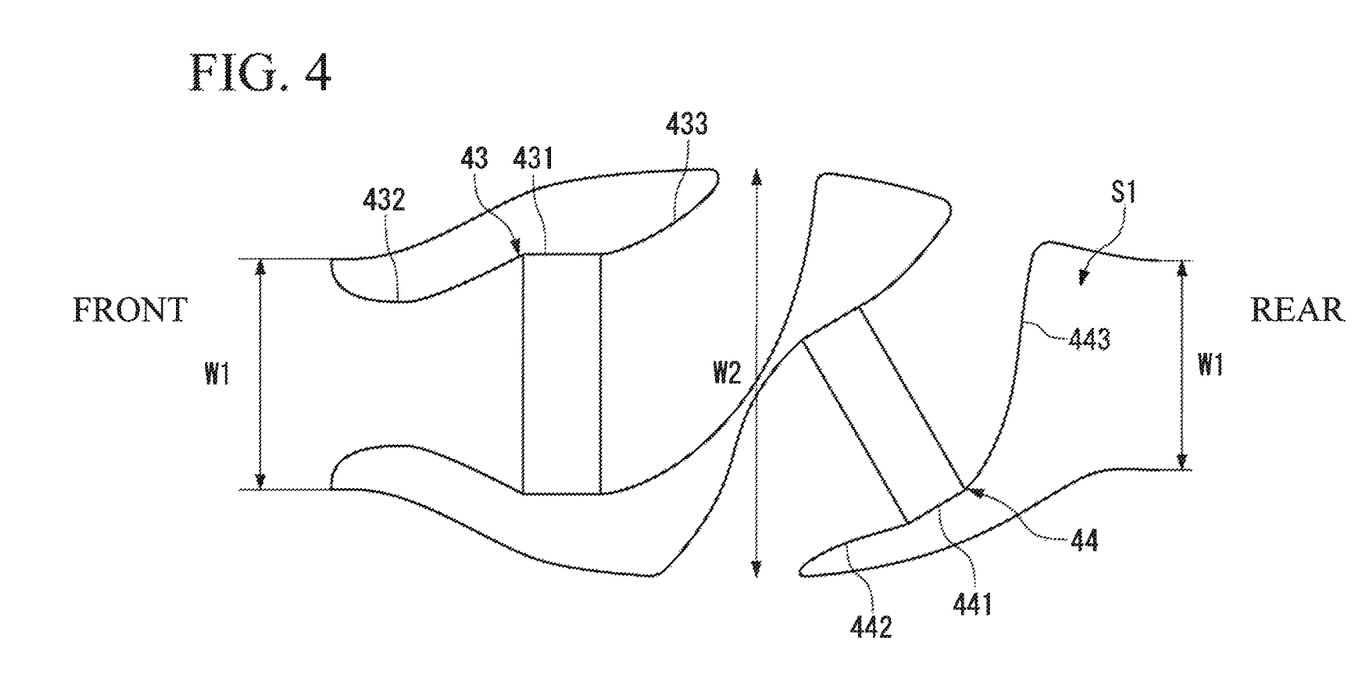
FIG. 4 is a plan schematic view illustrating an upper outfitting space of a bypass flow path.

The engine oil cooler 43 and the precooler 44 are thereby arranged in the upper outfitting space S1 as shown in FIG. 4.

The engine oil cooler 43 cools engine oil used in the engine body 12 by using the fan flow as a heat source (cold source). The engine oil cooler 43 includes a plate-fin type body 431, an intake duct 432, and an exhaust duct 433.

The precooler 44 cools bleed air from the engine body 12 so as to use the bleed air for an onboard air-conditioner or the like by using the fan flow as a heat source (cold source). The precooler 44 includes a plate-fin type body 441, an intake duct 442, and an exhaust duct 443.

To introduce a larger amount of fan flow into the engine oil cooler 43, and ensure a stable operation of the engine body 12, the engine oil cooler 43 is arranged ahead of the precooler 44.

In the upper outfitting space S1, a width W2 in the longitudinal center is larger than a width W1 at longitudinal both ends corresponding to the shape of the nacelle 14.

In the upper outfitting space S1, a height in the longitudinal center (a dimension in a direction perpendicular to the paper face of FIG. 4) is larger than a height at the longitudinal both ends. This is because the diameter of the engine body 12 is reduced as shown in FIG. 1.

As described above, since the interval between the nacelle 14 and the core cowl 15 is small, the upper outfitting space S1 is small. However, a volume large enough to install the engine oil cooler 43 and the precooler 44 is ensured in the longitudinal center and its vicinity of the upper outfitting space S1.

Figure 5:
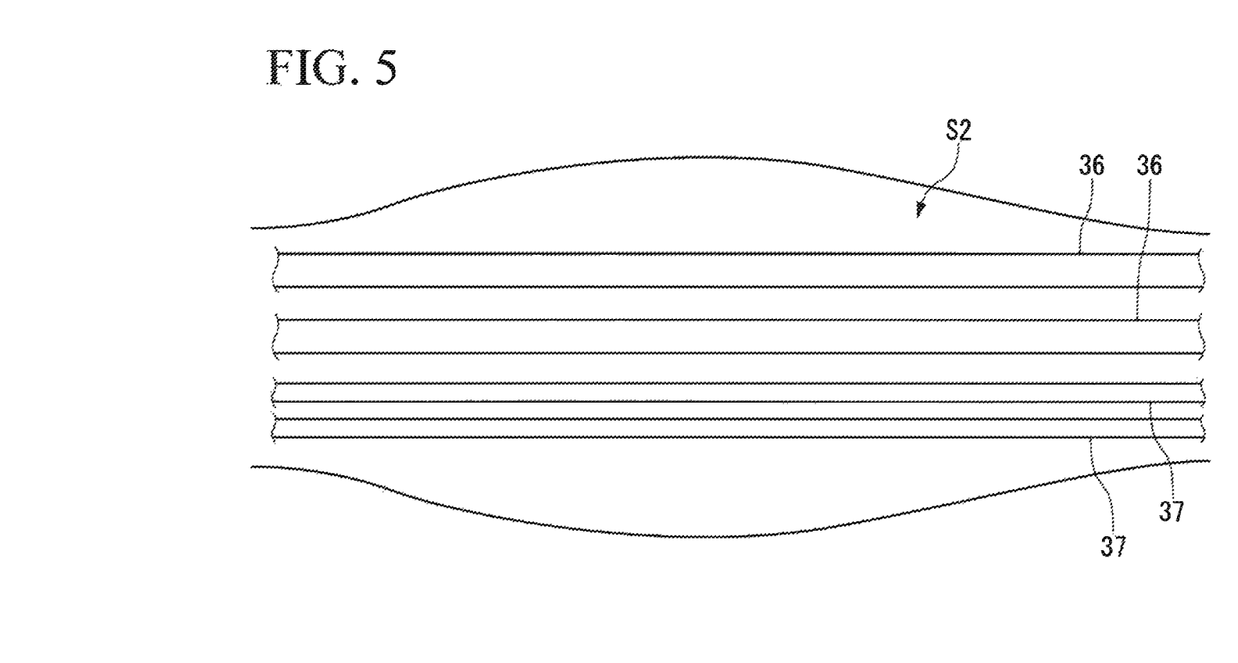
FIG. 5 is a plan schematic view illustrating a lower outfitting space of the bypass flow path.

The lower outfitting space S2 is also formed so as to have a larger volume in the longitudinal center than at longitudinal both ends similarly to the upper outfitting space S1.

As shown in FIG. 5, a plurality of tubes 36 and a plurality of cables 37 (electric lines) are passed through the lower outfitting space S2. FIG. 5 schematically shows the tubes 36 and the cables 37 in a simplified manner. The tubes 36 and the cables 37 are also arranged at different height positions from each other in the lower outfitting space S2. The same applies to tubes and cables (described below) arranged in the pylon body 41.

The tubes 36 feed the bleed air from the engine body 12 to an ice protection system (not shown).

The ice protection system prevents adhesion of ice to the vicinity of the air inlet 16. To ensure redundancy, the two tubes 36 are prepared.

The tubes 36 are connected to an extraction port that is provided in a lower portion of the engine body 12. To feed the engine bleed air at high temperature from the extraction port to the ice protection system, the respective tubes 36 are wired over a shortest possible distance by passing the respective tubes 36 through the lower outfitting space S2.

The cables 37 supply electric power to the FADEC 21. To ensure redundancy, the two cables 37 are prepared. The cables 37 supply electric power to the FADEC 21 installed on the outer periphery of the case 131 of the fan 13 from a power unit (including the generator 20) provided in the aircraft, or an external power unit connected to the aircraft.

Generally, the igniter cables 35 are passed through the lower outfitting space S2 in various engines employed in passenger planes.

However, since the lower outfitting space S2 is small, and the tubes 36 and the cables 37 occupy a large portion of the lower outfitting space S2 as described above, there is no room for passing other lines or pipes such as the igniter cables 35 in the lower outfitting space S2.

Here, the igniter cables 35 need to be wired apart a predetermined distance from electric lines or structures arranged around the igniter cables 35 as described above. Thus, the igniter cables 35 require a larger space than the power cables 37 of the FADEC 21.

Therefore, the igniter cables 35 cannot be arranged in the lower outfitting space S2 instead of the power cables 37 of the FADEC 21.

Also, it is necessary to pass the tubes 36 connected to the ice protection system through the lower outfitting space S2 in order to obtain sufficient ice protection performance. Therefore, the igniter cables 35 cannot be arranged in the lower outfitting space S2 instead of the tubes 36.

Accordingly, the tubes 36 and the cables 37 are given priority over the igniter cables 35. Only the tubes 36 and the cables 37 are passed through the lower outfitting space S2.

A path in which the igniter cables 35 are wired is sought in another place. However, the engine oil cooler 43 and the precooler 44 suspended from the pylon body 41 exist in the upper outfitting space S1. Therefore, the igniter cables 35 cannot be also passed through the upper outfitting space S1.

Thus, the path in which the igniter cables 35 are wired is sought in the pylon body 41 (FIGS. 1 and 3).

The inner portion of the pylon body 41 does not have a volume large enough to accommodate the accessories therein, and is smaller than the outfitting spaces S1 and S2. However, there exists an empty space large enough to pass the igniter cables 35.

The igniter cables 35 and other tubes or cables are passed through the inner portion of the pylon body 41.

Examples of the tubes passed through the inner portion of the pylon body 41 include a fuel pipe and a hydraulic pipe. A hydraulic pipe for operating the thrust reverser is also passed through the pylon body 41.

Examples of the cables passed through the inner portion of the pylon body 41 include a signal cable for transmitting and receiving a signal between the FADEC 21 and avionics, and a signal cable used for sensing or controlling the operations of the generator 20 and various valves.

The igniter cables 35 are arranged apart a predetermined distance from other cables or structures within the pylon body 41. Electromagnetic interference is thereby suppressed.

Wiring paths of all of various pipes and lines required in the turbofan engine 10, including the igniter cables 35 that are normally passed through the lower outfitting space S2, are generally determined. This is because once a certain element is technically established, the established element is taken over with no change in the development of aircraft.

In the present embodiment, the igniter cables 35 are passed through the inner portion of the pylon body 41 by breaking down the situation. It has been confirmed ignition performance similar to that of a case in which the igniter cables 35 are passed through the lower outfitting space S2 can be obtained even when the wiring path of the igniter cables 35 is changed as described above.

The ignition control unit 32 connected to the igniter cables 35 is preferably installed at an upper portion of the case 131 of the fan 13 because the igniter cables 35 are passed through the pylon body 41.

Accordingly, the igniter cables 35 passed through the inner portion of the pylon body 41 can be connected to the ignition control unit 32 at a position close to a front end of the pylon body 41 without extending the igniter cables 35 a long distance in a lower portion. The length of the igniter cables 35 can be thereby reduced, so that weight reduction and improvement of fuel consumption of the aircraft can be achieved.

In accordance with the present embodiment, it is possible to accommodate all of the required pipes and lines in the outfitting spaces S1 and S2 and the pylon body 41 by passing the igniter cables 35, which cannot be passed through the lower outfitting space S2, through the pylon 40 in response to a demand for ensuring required thrust at low fuel consumption and also ensuring a sufficient braking force at the time of landing by reverse thrust by reducing the widths of the outfitting spaces S1 and S2 in the turbofan engine 10 having a small interval between the nacelle 14 and the core cowl 15.

Since the wiring paths of the pipes and lines are ensured as described above, it is possible to achieve low fuel consumption and also ensure a sufficient braking force by reducing the widths of the outfitting spaces S1 and S2 to required minimum values.

The constitutions described in the embodiment described above may be also freely selected or changed into other constitutions without departing from the gist of the present invention.

For example, the igniter cables 35 do not need to be passed through the pylon body 41 from the front end to a rear end of the pylon body 41. The igniter cables 35 may be inserted into the inner portion of the pylon body 41 from an opening formed in a lower portion on the front end side of the pylon body 41, and removed to an outer portion of the pylon body 41 from an opening formed in a lower portion on the rear end side of the pylon body 41.

That is, the present invention also includes a configuration in which the igniter cable is passed through the inside of the pylon only in a portion of a length direction of the pylon.

What is claimed is:

1. An aircraft comprising a turbofan engine including an engine body and a fan,
   wherein the turbofan engine is supported on an airframe via a pylon,
   an igniter cable is interposed between an ignition plug disposed in a combustion chamber of the engine body and an ignition control unit that controls electric power supply to the ignition plug, the ignition control unit disposed at an upper portion of a case of the fan, wherein a part of the igniter cable which is passed through an inside of the pylon is arranged a predetermined distance apart from additional cables disposed in the inside of the pylon, and
   at least a part of the igniter cable is passed through the inside of the pylon.

2. The aircraft according to claim 1, comprising
an engine oil cooler that is a heat exchanger cooling engine oil used in the engine body by using air flowing out of the fan as a cold source, and
a precooler that is a heat exchanger cooling bleed air from the engine body by using the air as a cold source,
wherein the engine oil cooler and the precooler are arranged between the pylon and the engine body.

3. The aircraft according to claim 1,
wherein the pylon comprises a pylon body and a fairing that covers the pylon body.

4. The aircraft according to claim 1,
wherein at least a part of the igniter cable is passed through an inside of the pylon body.

5. The aircraft according to claim 1,
wherein the igniter cable is passed through an inside of the fairing.

6. The aircraft according to claim 2,
wherein the pylon comprises a pylon body and a fairing that covers the pylon body, and
the engine oil cooler and the precooler are suspended from a lower side of the pylon body.

7. The aircraft according to claim 1,
wherein additional tubes are also passed through the inside of the pylon, and
the igniter cable is arranged apart a predetermined distance from the additional tubes.

8. The aircraft according to claim 1,
wherein the turbofan engine is supported on a lower side of a main wing of the airframe via the pylon.

9. The aircraft according to claim 2,
wherein the engine oil cooler and the precooler are arranged in tandem along a longitudinal direction of an air bypass flow path extending between a nacelle and a core cowl which covers the engine body, the nacelle constituting an outer shell of the turbofan engine.

10. The aircraft according to claim 1,
wherein the igniter cable connects to the ignition control unit at a location near a front end of a pylon body.

11. The aircraft according to claim 1,
wherein the igniter cable extends in an upper portion of the case of the fan to minimize a length of the igniter cable.

* * * * *